(12) United States Patent
Arbore

(10) Patent No.: US 6,903,865 B2
(45) Date of Patent: *Jun. 7, 2005

(54) COMMUNICATION SYSTEM USING S-BAND ER-DOPED FIBER AMPLIFIERS WITH DEPRESSED CLADDING

(75) Inventor: Mark A. Arbore, Los Altos, CA (US)

(73) Assignee: Lightwave Electronics, Mountain View, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 10/186,561

(22) Filed: Jun. 28, 2002

(65) Prior Publication Data

US 2003/0169483 A1 Sep. 11, 2003

Related U.S. Application Data

(63) Continuation-in-part of application No. 10/095,303, filed on Mar. 8, 2002.

(51) Int. Cl.[7] .................................................. H01S 3/00
(52) U.S. Cl. ................................ 359/341.1; 359/341.3
(58) Field of Search ........................ 359/341.1, 341.3, 359/341.31; 372/6; 385/127

(56) References Cited

U.S. PATENT DOCUMENTS

| | | |
|---|---|---|
| 4,515,436 A | 5/1985 | Howard et al. |
| 4,764,933 A | 8/1988 | Kozlovsky et al. |
| 5,056,888 A | 10/1991 | Messerly et al. |
| 5,260,823 A | 11/1993 | Payne et al. |
| 5,392,154 A | 2/1995 | Chang et al. |
| 5,452,116 A | 9/1995 | Kirkby et al. |
| 5,473,714 A | 12/1995 | Vengsarkar |
| 5,673,342 A | 9/1997 | Nelson et al. |
| 5,801,858 A | 9/1998 | Roberts et al. |
| 5,818,630 A | 10/1998 | Fermann et al. |
| 5,867,305 A | 2/1999 | Waarts et al. |
| 5,880,877 A | 3/1999 | Fermann et al. |
| 5,892,615 A | 4/1999 | Grubb et al. |
| 5,930,030 A | 7/1999 | Scifres |

(Continued)

OTHER PUBLICATIONS

L.G. Cohen et al., "Radiating Leaky–Mode Losses in Single–Mode Lightguides with Depressed–Index Claddings," IEEE Journal of Quantum Electronics, vol. QE–18, No. 10, Oct. 1982, pp. 1467–1472.
Ishikawa et al., "Novel 1500 nm–Band EDFA with Discrete Raman Amplifier," ECOC–2001, Post Deadline Paper.
Stolen et al, "Short W–Tunneling Fibre Polarizers," Electronics Letters, vol. 24, 1988, pp. 524–525.

*Primary Examiner*—Mark Hellner
(74) *Attorney, Agent, or Firm*—Lumen Intellectual Property Services, Inc.

(57) ABSTRACT

An optical communication system such as a Wavelength-Division-Multiplexed (WDM) or Dense Wavelength-Division-Multiplexed (DWDM) communication system using Erbium doped fiber amplifiers (EDFAs) for amplifying signals in the S-band. The fiber amplifier has a core doped with Erbium and defined by a core cross-section and a refractive index $n_0$. The fiber amplifier has a depressed cladding surrounding the core and a secondary cladding surrounding the depressed cladding. The depressed cladding has a depressed cladding cross-section and a refractive index $n_1$, and the secondary cladding has a secondary cladding cross-section and a refractive index $n_2$. The fiber amplifier has a pump source for pumping the Erbium to a level of high relative inversion D such that the Erbium exhibits positive gains in the S-band and high gains in a long wavelength band longer than the S-band, i.e., in the C- and L-Bands. The core cross-section, the depressed cladding cross-section and the refractive indices $n_0$, $n_1$, and $n_2$ are selected to obtain losses at least comparable to the high gains in the long wavelength band and losses substantially smaller than the positive gains in the S-band. The optical communication system can employ the fiber amplifier as a pre-amplifier, a power-boosting amplifier or an in-line amplifier.

13 Claims, 5 Drawing Sheets

U.S. PATENT DOCUMENTS

| | | |
|---|---|---|
| 5,933,271 A | 8/1999 | Waarts et al. |
| 6,021,141 A | 2/2000 | Nam et al. |
| 6,049,417 A | 4/2000 | Srivastava et al. |
| 6,118,575 A | 9/2000 | Grubb et al. |
| 6,154,321 A | 11/2000 | Melville et al. |
| 6,181,465 B1 | 1/2001 | Grubb et al. |
| 6,212,310 B1 | 4/2001 | Waarts et al. |
| 6,278,816 B1 | 8/2001 | Keur et al. |
| 6,301,271 B1 | 10/2001 | Sanders et al. |
| 6,307,994 B1 | 10/2001 | Paek et al. |
| 6,563,995 B2 * | 5/2003 | Keaton et al. ............... 385/127 |
| 6,633,429 B2 * | 10/2003 | Kinoshita et al. ......... 359/337.1 |
| 2002/0172485 A1 * | 11/2002 | Keaton et al. ............. 385/127 |
| 2003/0169486 A1 * | 9/2003 | Arbore et al. ........... 359/341.3 |
| 2003/0169488 A1 * | 9/2003 | Arbore et al. ........... 359/341.4 |
| 2004/0052278 A1 * | 3/2004 | Kane et al. ................... 372/25 |

* cited by examiner

COMMUNICATION SYSTEM USING S-BAND ER-DOPED FIBER AMPLIFIERS WITH DEPRESSED CLADDING

RELATED APPLICATIONS

This application is a continuation-in-part of U.S. application Ser. No. 10/095,303 filed on Mar. 8th, 2002.

FIELD OF THE INVENTION

The present invention relates generally to communication systems employing Erbium doped fiber amplifiers (EDFAs) that amplify signals in the S-band.

BACKGROUND OF THE INVENTION

The problem of amplifying optical signals for long distance transmission was successfully addressed by the development of Erbium doped fiber amplifiers (EDFAs). An EDFA consists of a length of silica fiber with the core doped with ionized atoms ($Er^{3+}$) of the rare earth element Erbium. The fiber is pumped with a laser at a wavelength of 980 nm or 1480 nm. The doped, pumped fiber is optically coupled with the transmission fiber so that the input signal is combined with the pump signal in the doped fiber. Early EDFAs could provide 30 to 40 dB of gain in C-band extending between 1530 to 1565 nm with noise figures of less than 5 dB. Recently, EDFAs have been developed that can provide similar performance in the L-band (1565 to 1625 nm).

There is great interest in the telecommunications industry to make use of the optical spectrum range with wavelengths shorter than those currently achievable with conventional C-band and L-band EDFAs. This wavelength range, commonly called the "S-band" or "short-band" is considered to cover wavelengths between about 1425 nm and about 1525 nm. The gain in the S-band typically observed in EDFAs is limited by several factors, including incomplete inversion of the active erbium ions and by amplified spontaneous emissions (ASE) or lasing from the high gain peak near 1530 nm.

In producing an EDFA for the S-band the relatively high losses and low gains over the S-band render the selection of fiber and the design of the amplifier system very difficult. In fact, the problems are so severe that the prior art teaches interposition of external filters between EDFA sections to produce an S-band EDFA. For example, Ishikawa et al. disclose a method of fabricating an S-band EDFA by cascading five stages of silica-based EDFA and four ASE suppressing filters in Ishikawa et al., "Novel 1500 nm-Band EDFA with discrete Raman Amplifier", ECOC-2001, Post Deadline Paper. In Ishikawa et al.'s experimental setup, the length of each EDFA is 4.5 meters. The absorption of each suppressing filter at 1.53 $\mu$m is about 30 dB and the insertion losses of each suppressing filter at 1.48 $\mu$m and 0.98 $\mu$m are about 2 dB and 1 dB respectively. The pumping configuration is bi-directional, using a 0.98 $\mu$m wavelength to keep a high inversion of more than $D \geq 0.7$ (D, relative inversion). The forward and backward pumping powers are the same and the total pumping power is 480 mW. Ishikawa et al. show a maximum gain of 25 dB at 1518.7 nm with 9 dB gain tilt.

This method is relatively complicated and not cost-effective, as it requires five EDFAs, four ASE suppressing filters and high pump power. Also, each of the ASE suppressing filters used in Ishikawa et al.'s method introduces an additional insertion loss of 1–2 dB. The total additional insertion loss is thus about 4–8 dB.

Another approach to providing amplification in the S-band has focused on fiber amplifiers using Thulium as the lasing medium doped into a Fluoride fiber core (TDFAs). See, for example, "Gain-Shifted Dual-Wavelength-Pumped Thulium-Doped-Fiber Amplifier for WDM Signals in the 1.48–1.51-$\mu$m Wavelength Region" by Tadashi Kasamatsu, et. al., in IEEE Photonics Technology Letters, Vol. 13, No. 1, January 2001, pg. 31–33 and references therein. While good optical performance has been obtained using TDFAs, this performance has only been possible using complex, non-standard and/or expensive pumping schemes. Also, TDFAs suffer from the problems inherent to their Fluoride fiber host material, namely high fiber cost, poor reliability and difficulty splicing to standard silica fibers used elsewhere in the amplifier system.

Optical amplifiers (such as EDFAs, TDFAs, Raman amplifiers, semiconductor amplifiers, etc . . . ) are used for several purposes in a telecommunications network. The most important use is to compensate for span loss (transmission fiber loss accumulated over tens or hundreds of km), in which case the amplifier is typically called an "in-line amplifier". In-line amplifiers must provide a small-to-moderate amount of optical power per optical channel (typically 0.1–10 mW), but must also exhibit low noise figure and good gain flatness in the case of WDM networks. The latter two requirements result from the accumulated effects of a long cascade of amplifiers over a long fiber link of hundreds to thousands of km in length.

Optical amplifiers are also used as pre-amplifiers. Pre-amplifiers are typically used in order to improve the sensitivity of receivers, in ways that are well known in the art. Typically, the pre-amplifier is located just before the signal receiver in order to increase the signal strength (optical power) to a level well above the (electronic, or thermal) detector noise. Pre-amplifiers should exhibit very good noise figure, though they do not need to operate at high powers or with flattened gain profiles because they typically are used to amplify one or a small number of optical channels.

Optical amplifiers are also used as power-amplifiers. Power amplifiers are used in ways well known in the art to provide high optical power. Typically, they are operated with relatively high input signal strengths (i.e. are saturated) with good input signal-to-noise ratios, and therefore do not need very good noise figures. Also, they typically do not need very high gain. Power amplifiers are used when a large number of WDM channels are present, even when, for example, each channel needs only a moderate level of power. Power amplifiers are also used preceding long/lossy links in order to pre-compensate for the upcoming losses.

Finally, optical amplifiers are used for many other applications inside communications networks. Some examples are: power boosting prior-to or after splitting a signal into many parallel outputs, compensating for lossy network modules such as cross-connects and switches, providing high enough optical powers to pump nonlinear devices such as optically driven optical switches or optical wavelength converters.

In view of the above, it would be an advance in the art to provide an optical communication system that can take advantage of EDFAs for amplifying signals in the S-band. In particular, it would be advantageous to provide low-cost S-band EDFAs for use in such communication systems to achieve low-cost pre-amplification, power-boosting and in-line amplification.

OBJECTS AND ADVANTAGES

It is a primary object of the present invention to provide an optical communication system that can transmit and amplify signals in the S-band of wavelengths. Specifically, the system should be capable of using an Er-doped fiber amplifier (EDFA) to amplify signals contained in the S-band in a controlled fashion to enable pre-amplification, power-boosting and in-line amplification.

These and numerous other advantages of the present invention will become apparent upon reading the following description.

SUMMARY

The objects and advantages of the invention are achieved by an optical communication system using a signal source that provides a signal in the S-band of wavelengths, or simply in the S-band. The communication system typically includes an optical fiber that transmits a signal in the S-band. The communication system typically also includes one or more optical amplifiers, typically in the form of a fiber amplifier. The fiber amplifier has a core defined by a core cross-section and a refractive index $n_0$. Erbium is doped into the core of the fiber amplifier for amplifying the signal. The fiber amplifier has a depressed cladding surrounding the core and a secondary cladding surrounding the depressed cladding. The depressed cladding has a depressed cladding cross-section and a refractive index $n_1$, and the secondary cladding has a secondary cladding cross-section and a refractive index $n_2$. The fiber amplifier has a pump source for pumping the Erbium contained in the core to a level of high relative inversion D; in this state the Erbium can amplify the signal. In particular, the pumping causes Erbium to exhibit positive gains in the S-band and high gains in a long wavelength band longer than the S-band, i.e., in the C- and L-Bands. The core cross-section, the depressed cladding cross-section and the refractive indices $n_0$, $n_1$, and $n_2$ are selected to obtain losses at least comparable to the high gains in the long wavelength band and losses substantially smaller than the positive gains in the S-band.

The optical communication system can use the fiber amplifier as a pre-amplifier, a power-boosting amplifier or an in-line amplifier. The optical communication system can be a Wavelength-Division-Multiplexed (WDM) communication system, e.g., a Dense WDM (DWDM) system. The WDM system has a communication fiber, typically a long section or span of communication fiber, between a Wavelength-Division-Multiplexer or WDM multiplexer and a WDM demultiplexer. The WDM multiplexer multiplexes a number of information-bearing signals and launches them over the communication fiber from a transmitting end. The WDM demultiplexer demultiplexes the signals arriving on the communication fiber at the receiving end. When the fiber amplifier is used as a pre-amplifier, it is preferably installed after the WDM demultiplexer. The fiber amplifier can also be installed between the WDM multiplexer and demultiplexer to serve the function of a power-boosting amplifier or an in-line amplifier. Of course, the fiber amplifier can also serve the function of a pre-amplifier in this position.

In a multiplexed system, such as the WDM communication system the signal source preferably comprises a laser belonging to a laser array. The pump source providing the pump radiation to invert the population in the Er ions can be any suitable pump source. For example, the pump source is a laser diode emitting pump radiation at about 980 nm. Alternative sources delivering pump radiation at about 980 nm or other Er pump bands at wavelengths shorter than the wavelengths contained in the S-band can also be used.

A detailed description of the invention and the preferred and alternative embodiments is presented below in reference to the attached drawing figures.

DETAILED DESCRIPTION

Figure 1:
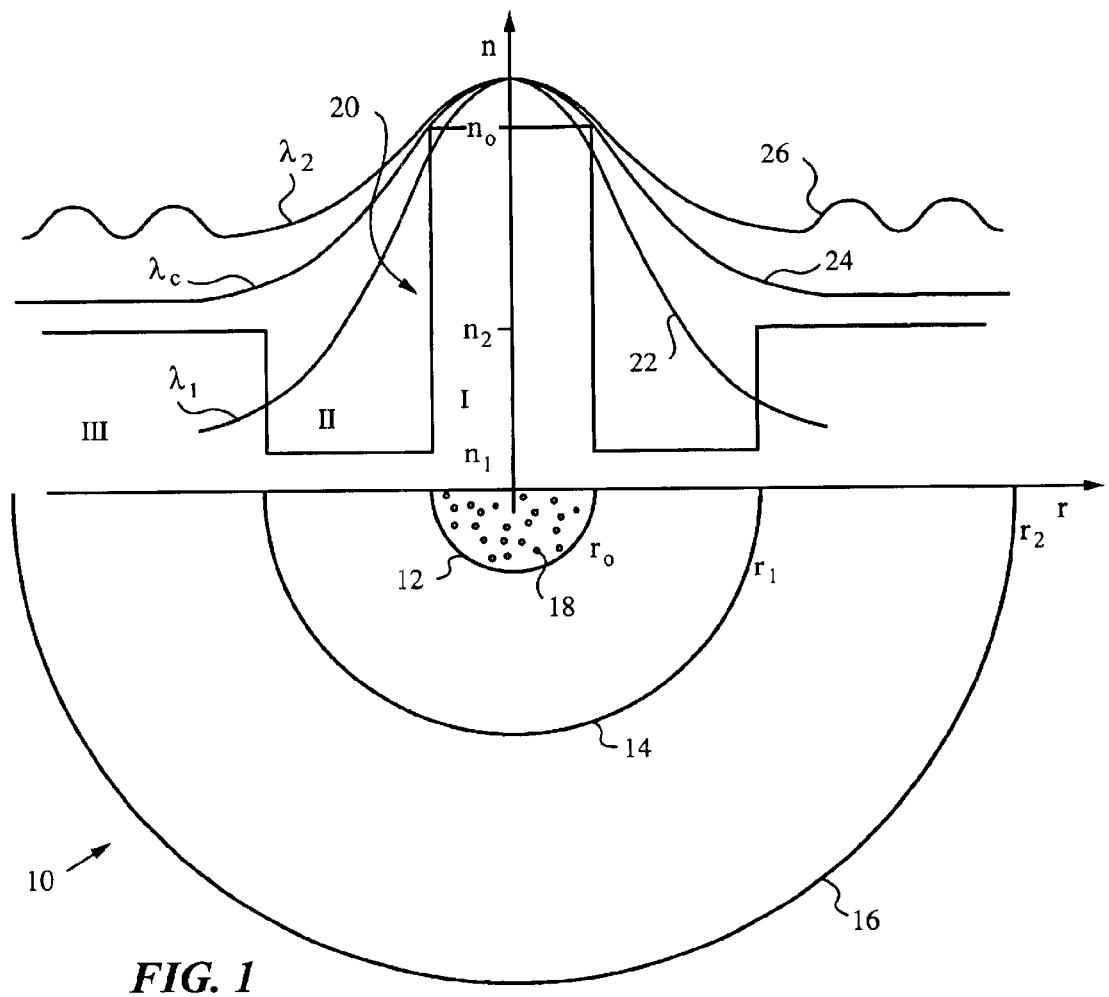
FIG. 1 is a diagram illustrating in cross-section a fiber amplifier for amplifying signals in the S-band of wavelengths according to the invention.
Figure 2:
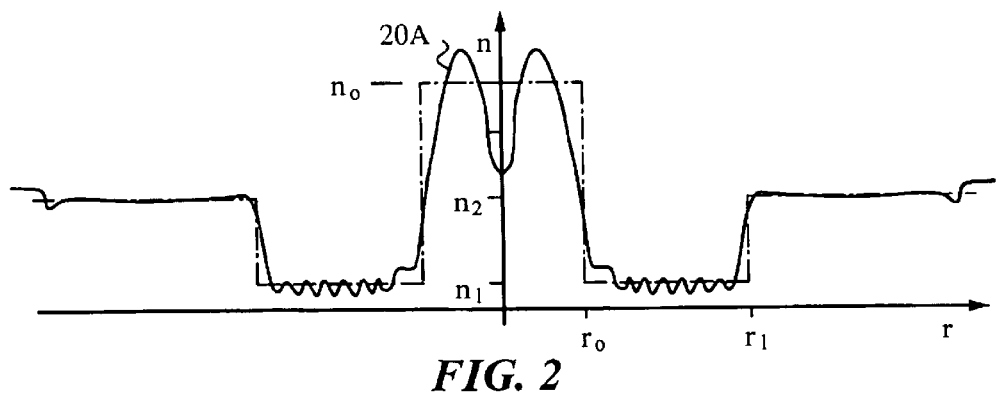
FIG. 2 is a graph illustrating a typical index profile in the fiber of FIG. 1.

Optical communication systems using Er-doped fiber amplifiers to amplify signals in the S-band of wavelengths will be best understood by first reviewing the principles of EDFAs fabricated in a depressed cladding or W-profile fiber 10 as illustrated in FIGS. 1–2. FIG. 1 is a diagram illustrating a portion of a cross-section of fiber 10 having a core 12 surrounded by a depressed cladding 14. Depressed cladding 14 is surrounded by a secondary cladding 16. Core 12 has a circular cross-section, as do depressed cladding 14 and secondary cladding 16. A region I associated with core 12 extends from $0 \leq r \leq r_0$, depressed cladding 14 and secondary cladding 16 occupy regions II, III extending between $r_0 \leq r \leq r_1$ and $r \geq r_1$. Core 12 has an index of refraction $n_0$, depressed cladding 14 has an index of refraction $n_1$ and secondary cladding 16 has an index of refraction $n_2$. The graph positioned above the partial cross-section of fiber 10 illustrates an average index profile 20 defining a W-profile in fiber 10. In the present embodiment fiber 10 is a single mode fiber for wavelengths within the S-band.

Ions of the rare earth element Erbium 18 are doped into core 12 of fiber 10. Erbium 18 acts as a lasing medium and exhibits high gains in a long wavelength band including the C- and L-bands. Erbium 18 also has positive gains in a short or S-band of wavelengths shorter than the wavelengths in the C- and L-Bands. Specifically, when pumped to a high relative inversion D, the high gains of Erbium 18 in the long wavelength band cause amplified spontaneous emissions (ASE) or lasing which reduces the population inversion of Erbium 18 and thus reduces the positive gains in the S-band. Nevertheless, the W-index profile 20 enables fiber 10 to effectively amplify signals in the S-band. This is accomplished by selecting the core cross-section, the depressed cladding cross-section, and the refractive indices $n_0$, $n_1$, and $n_2$ to produce losses at least comparable to the high gains in the long wavelength band and losses substantially smaller than the positive gains in said S-band. The principles of this selection are explained below.

FIG. 2 illustrates a W-profile 20A as is obtained with normal manufacturing techniques. For the purposes of the invention it is sufficient that the radially varying index of core 12 have an average value equal to $n_0$. Likewise, it is sufficient that indices of depressed cladding 14 and secondary cladding 16 average out to the values $n_1$ and $n_2$. The average index $n_0$ of core 12 is significantly higher than index $n_1$ of depressed cladding 14 and index $n_2$ of secondary cladding 16. A selection of appropriate values of indices $n_0$, $n_1$, $n_2$ and radii $r_0$, $r_1$, $r_2$ is made to have a fundamental mode cutoff wavelength $\lambda_c$ between the S-band and the long wavelength band including the C- and L-Bands. In particular, cutoff wavelength $\lambda_c$ is preferably set at about 1530 nm. Thus, a signal propagating in the fundamental mode at a wavelength smaller than $\lambda_c$, i.e., in the S-band is retained in core 12. Meanwhile, a signal propagating in fundamental mode at wavelength $\lambda_c$ or at a longer wavelength, i.e., in the C- and L-Bands is lost to secondary cladding 16 over a short distance.

Fundamental mode cutoff wavelength $\lambda_c$ for fiber 10 is set in accordance to selection rules for cross-sections and refractive indices $n_0$, $n_1$ and $n_2$ of fiber 10 as derived from Maxwell's equations. In the weak guiding approximation (which is valid when the indices of refraction of core 12 and claddings 14, 16 are all relatively close to each other), the Maxwell vector equations can be replaced with a scalar equation. The scalar $\psi$ represents the strength of the transverse electric field in the fiber. For more information, see for example G. Agrawal, "Nonlinear Fiber Optics" (Academic, San Diego, 1995), D. Marcuse, "Light Transmission Optics" (Van Nostrand, Princeton, 1972), and D. Marcuse, "Theory of Dielectric Optical Waveguides" (Academic, New York, 1974).

For convenience, let us define the following parameters:

$$u_0 = \sqrt{n_0^2 - n_2^2} \quad \text{and} \quad u_1 = \sqrt{n_2^2 - n_1^2}. \qquad (1)$$

The scalar field $\psi$ inside fiber 10 satisfies a wave equation whose solutions are Bessel functions and modified Bessel functions. For the fundamental mode supported by fiber 10, inside core 12 is thus:

$$\psi = J_0(\kappa r), \ 0 \leq r \leq r_0 \ (\text{region I}) \qquad (2)$$

where $\kappa$ is an eigenvalue that needs to be determined, and $J_0$ is the zeroth Bessel's function.

Inside depressed cladding 14, the scalar field $\psi$ is:

$$\psi = A K_0(\beta r) + B I_0(\beta r), \ r_0 \leq r \leq r_1 \ (\text{region II}) \qquad (3)$$

where A and B are constants to be determined, $\beta^2 = (u_0^2 + u_1^2)(2\pi/\lambda)^2 - \kappa^2$, and $K_0$ and $I_0$ are the modified Bessel's functions. Here $\lambda$ is the vacuum wavelength of the light.

In secondary cladding 16, we obtain:

$$\psi = C K_0(\gamma r), \ r \geq r_1 \ (\text{region III}) \qquad (4)$$

Here C is another constant, and $\gamma^2 = u_0^2(2\pi/\lambda)^2 - \kappa^2$. A, B, C, and $\kappa$ are found using the boundary conditions, which require that $\psi$ and its first derivative are both continuous at $r_0$ and $r_1$.

It can be shown that fundamental mode cutoff wavelength $\lambda_c$ is a wavelength $\lambda$ at which $\gamma = 0$. (See for example, Cohen et al., IEEE J. Quant. Electron. QE-18 (1982) 1467–1472.)

For additional convenience, let us define the following parameters:

$$x = \frac{2\pi u_0 r_0}{\lambda_c}, \quad \rho = u_1/u_0, \quad s = r_1/r_0. \qquad (5)$$

Now, fundamental mode cutoff wavelength $\lambda_c$ can be determined if parameter x is determined. That determination can be made with the aid of algebra known to a person skilled in the art, since parameter x is the root of the following equation:

$$\rho J_0(x) K_1(\rho x) I_1(\rho s x) - \rho J_0(x) I_1(\rho x) K_1(\rho s x) - J_1(x) K_1(\rho s x) I_0(\rho x) - J_1(x) I_1(\rho s x) K_0(\rho x) = 0. \qquad (6)$$

Three observations should be made regarding the parameter x. First, x does not exist for all values of s and $\rho$. For example, for $\rho = 1$ and $s \leq \sqrt{2}$, there is no x that satisfies Eq. (6). This means that all wavelengths are guided in core 12 in this regime. The criterion that Eq. (6) have a solution is:

$$s^2 \geq 1 + 1/\rho^2. \qquad (7)$$

Second, for practical applications x cannot be too small. This is because, according to Eq. (5), the parameter x is proportional to radius $r_0$ of core 12, and the radius has to be large enough that it is easy to couple light into and out of core 12. (A smaller core 12 also makes the nonlinear effects stronger, which is often a disadvantage.) Therefore, since $x = 2\pi u_0 r_0/\lambda_c$, preferably $x \geq 1$. This implies that $\rho \geq 0.224$ or, in terms of the refractive indices $$\sqrt{(n_2^2 - n_1^2)/(n_0^2 - n_2^2)} \geq 0.224.$$

Third, it is evident from Eq. 7 that for larger values of s, the value of x only weakly depends on s. Thus it is advantageous to have a fiber in this region of parameter space, since a manufacturing flaw producing an error in s will have a small effect on the value of fundamental mode cutoff wavelength $\lambda_c$. Therefore, it is convenient to use the rule $s \geq 1 + 1/\rho$, or in terms of the refractive indices:

$$\frac{r_1}{r_0} \geq 1 + \sqrt{(n_0^2 - n_2^2)/(n_2^2 - n_1^2)}. \qquad (8)$$

The selection of cross sections and refractive indices of core 12, depressed cladding 14 and outer cladding 16 is guided by the above rules in setting the appropriate fundamental mode cutoff wavelength $\lambda_c$. First, $\lambda_c$ is pre-selected, e.g. at a wavelength close to 1530 nm, and then convenient values are selected for $u_0$ and $r_0$. Based on these choices x is computed from equation 5, and conveniently $x \geq 1$ (otherwise the previous choices can be adjusted). Then, suitable values of s and $\rho$ are found using equation 6. A range of values for $\rho$ and s will yield desired $\lambda_c$. Typically, all values of $\rho$ are larger than 0.224. In addition, the rule of equation 8 is used to further narrow the range of suitable values of $\rho$ and s.

Finally, the values of s and $\rho$ have an additional limitation. Namely, they must be selected so that core 12 of fiber 10 has a great enough loss, e.g., 100 dB/m or even 200 dB/m or more at a wavelength $\lambda > \lambda_c$. To find the loss at wavelength $\lambda > \lambda_c$, the fiber modes for light signals having a wavelength $\lambda > \lambda_c$ are required.

Equations (2), (3), and (4) specify the fundamental mode when $\lambda < \lambda_c$. When $\lambda > \lambda_c$, the function $\psi$ is oscillatory, rather than exponentially decaying, in secondary cladding 16. Therefore when $\lambda > \lambda_c$, Eq. (4) is replaced by:

$$\psi = C J_0(qr) + D N_0(qr), \ r \geq r_1 \ (\text{region III}) \qquad (9)$$

where $N_0$ (also called $Y_0$) is the zeroth Neumann function, $q^2 = \kappa^2 - u_0^2(2\pi/\lambda)^2$, and C and D are constants to be determined.

There are two key items to note regarding the modes for $\lambda > \lambda_c$. First, there are five unknowns (A, B, C, D, and $\kappa$) and four boundary conditions (continuity of $\psi$ and $d\psi/dr$ at $r_0$ and $r_1$). The equations are underconstrained: $\kappa$ may be chosen to be any value between 0 and $$(2\pi/\lambda)\sqrt{u_0^2 + u_1^2}.$$

Thus, there is a continuum of states for each $\lambda > \lambda_c$, corresponding to the continuum of values that $\kappa$ may have. This situation is quite different from the case $\lambda < \lambda_c$, where four unknowns (A, B, C, and $\kappa$) are fixed by the four boundary conditions, resulting in $\kappa$ being a discrete eigenvalue having a unique value at each $\lambda < \lambda_c$.

Second, the modes specified by Eqs. (2), (3), and (9) are eigenmodes of the fiber, e.g. a W-fiber; however, these modes do not correspond to the situation that is physically realized. This is a result of Eq. (9) containing both incoming and outgoing waves, whereas in practice only outgoing waves are present (the light at wavelength $\lambda > \lambda_c$ originally propagating in core 12 radiates out).

Nevertheless, the modes of Eqs. (2), (3), and (9) can be used to estimate the losses at wavelengths greater than $\lambda_c$. First, for a given wavelength $\lambda$, find the value of $\kappa$ that minimizes $C^2+D^2$. This corresponds to the mode that is the most long-lived within the core. (An analogy can be made between the wave equation for the scalar $\psi$ in the fiber and the quantum mechanical wave equation for a particle in a potential well. Then the quantum mechanical results can be borrowed. See for example David Bohm, "Quantum Theory", Dover 1989, Chapter 12 §14–22.)

Second, once $\kappa$ is found in the above manner, the outgoing waves can be computed from Eq. (9). These outgoing waves give a reasonable estimation of the loss from core 12 into secondary cladding 18, even when no incoming waves are present. These outgoing waves will cause beam at wavelength $\lambda > \lambda_c$ propagating in core 12 to be attenuated along the length of the fiber. If the beam has power P, then the change in power P with distance z along fiber 10 is described by the equation:

$$\frac{dP}{dz} = -\Lambda P. \qquad (10)$$

The loss is given by the coefficient $\Lambda$, which is approximately:

$$\Lambda = \frac{\lambda}{4\pi^2 n_0} \frac{C^2 + D^2}{\int_0^{r_0} r\,dr\,\psi^*\psi}. \qquad (11)$$

The loss $\Lambda$, having units of m$^{-1}$, can be converted to a loss $\beta$ in units dB/m, using the relation:

$$\beta = 10\,\log_{10}(e)\cdot\Lambda. \qquad (12)$$

Here the term "loss" refers to radiation that leaks out of core 12 into secondary cladding 16. In fact, the radiation may not be truly lost from fiber 10 itself, if it remains in secondary cladding 16. In some cases this will be sufficient. In other cases light from secondary cladding 16 can be out-coupled, as necessary.

Another method for calculating the losses involves calculating the complex propagation constant of the leaky fundamental mode of fiber 10. Leaky modes are discussed in, for example, D. Marcuse, "Theory of Dielectric Optical Waveguides" (Academic, New York, 1974) Chapter 1. The loss is related to the imaginary part of the complex propagation constant of the leaky mode. The complex propagation constant, or its equivalent that is the complex effective index of refraction, may be computed using commercially available software, such as that obtainable from Optiwave Corporation of Nepean, ON, Canada.

In some cases it may be preferable to numerically solve for the modes of a given fiber rather than use the Bessel function approach outlined above, since real fibers do not have the idealized step index profile indicated by profile 20 shown in FIG. 1, but have variations from the ideal as shown by graph 20A in FIG. 2 of the actual refractive index profile obtained in practice. In particular, the most common method of single-mode fiber manufacture today involves the MOCVD process, which typically leaves an index dip in the center of core 12. Numerical solutions can, more easily than the method described above, take into account the actual variations in refractive index as a function of radius. Such numerical calculations can again give fundamental mode cutoff wavelength $\lambda_c$ and fiber losses as a function of fiber parameters including cross-sections and refractive indices, allowing fiber 10 to be designed to exhibit the desired features.

When Eq. (11) is used to estimate the loss, refractive indices $n_0$, $n_1$, and $n_2$ will in general be average indices of refraction of profile 20, since the actual indices of refraction will vary somewhat as a function of radius (see profile 20A). Also, the index of refraction n is not necessarily radially symmetric. If the cross section of fiber 10 is described by polar coordinates r and $\theta$ the refractive index may depend upon the angle $\theta$ as well as the radius r. Thus, $n=n(r,\theta)$. Such an asymmetric fiber may be desirable for polarization maintenance, for example.

Here is the prerequisite for the fiber to have fundamental mode cutoff wavelength $\lambda_c$. Let R be a radius large enough that the index at radius R has substantially leveled off to the value $n_2$. Then fiber 10 will have fundamental mode cutoff wavelength $\lambda_c$ if (see B. Simon, Ann. Phys. 97 (1976), pp. 279):

$$\int_0^{2\pi} d\theta \int_0^R r\,dr\bigl(n^2(r,\theta) - n_2^2\bigr) \le 0. \qquad (13)$$

Note that given the profile of FIG. 1, Eq. (13) becomes:

$$\pi r_0^2 u_0^2 - \pi(r_1^2 - r_0^2)u_1^2 \le 0, \qquad (14)$$

which is equivalent to Eq. (7) above.

Fundamental mode cutoff wavelength $\lambda_c$ is the largest wavelength for which there is an eigenmode that is localized in region I. The losses for wavelengths above cutoff wavelength $\lambda_c$ can be determined, for example, by (i) solving for the modes that are not localized but include incoming and outgoing waves, (ii) for each wavelength finding the mode with the smallest outgoing intensity, and (iii) using this outgoing intensity to estimate the loss. As discussed above, other methods are also available to a person skilled in the art for calculating losses. In general, fiber 10 with a desired fundamental mode cutoff wavelength $\lambda_c$ and losses can therefore be designed by adjusting the profile $n(r,\theta)$, which is equivalent to adjusting the cross-sections and refractive indices of core 12, depressed cladding 14 and secondary cladding 16. The rules presented above will enable a person skilled in the art can to set fundamental mode cutoff wavelength $\lambda_c$ by making a selection of $r_0$, $r_1$, $n_0$, $n_1$ and $n_2$.

Referring back to FIG. 1, superposed on average index profile 20 is an intensity distribution of a guided fundamental mode 22 at a first wavelength $\lambda_1 < \lambda_c$. First wavelength $\lambda_1$ is contained within the S-band. A fundamental mode 24 that is no longer guided by fiber 10 is also superposed on index profile 20. Mode 24 is at cutoff wavelength $\lambda_c$. An intensity distribution of another mode 26 that is not guided by fiber 10 and exhibits an oscillating intensity distribution beyond core 12 and depressed cladding 14 is also shown. Radiation in mode 26 has a second wavelength $\lambda_2$, which is longer than cutoff wavelength $\lambda_c$<$\lambda_2$ and is contained in a long wavelength band, i.e., in the C- or L-Band.

Figure 3:
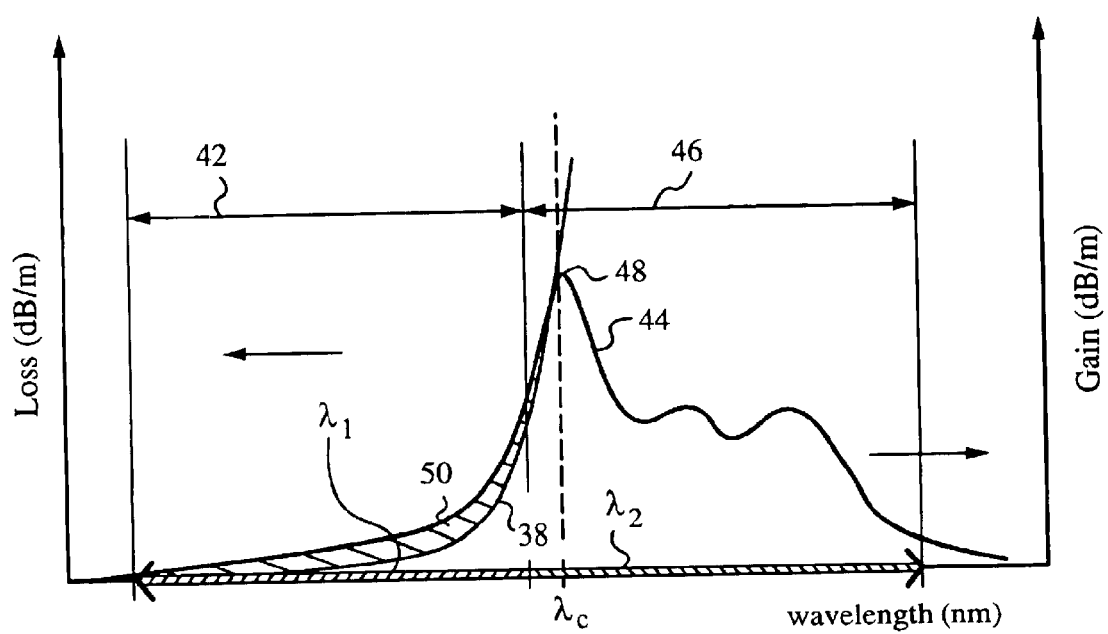
FIG. 3 illustrates a gain profile of Erbium when pumped to a high relative inversion D.

FIG. 3 illustrates a gain profile 44 of Erbium 18 when pumped to a high relative inversion D. The S-band is designated by reference 42, and long wavelength band is designated by reference 46. Gain profile 44 exhibits high gains in long wavelength band 46 and positive gains in S-band 42. In particular, high gains in long wavelength band 46 include a peak 48 at about 1530 nm that is very close to S-band 42.

In this embodiment the cross-sections or radii of core 12, depressed cladding 14 and refractive indices $n_0$, $n_1$, and $n_2$ are selected to place cutoff wavelength $\lambda_c$ right at peak 48. Additionally, the value of index $n_0$ of core 12 is selected to obtain a roll-off loss curve 38 about cutoff wavelength $\lambda_c$ set at peak 48 of high gains in long wavelength band 46. More particularly, roll-off loss curve 38 is selected to yield losses at least comparable to the high gains in long wavelength band 46 while yielding losses substantially smaller than the positive gains in S-band 42. Roll-off loss curve 38 drops below the positive gains indicated by profile 44 because of its rapid decrease or large positive slope to the left for wavelengths below cutoff wavelength $\lambda_c$. The gains thus exceed losses across entire S-band 42, as better visualized by hatched area 50. Preferably, roll-off loss curve 38 is such that the gains exceed the losses in S-band 42 by at least 5 dB. For more information on selecting appropriate roll-off loss curves the reader is referred to U.S. patent application Ser. No. 10/095,303 filed on Mar. 8$^{th}$, 2002.

Figure 4:
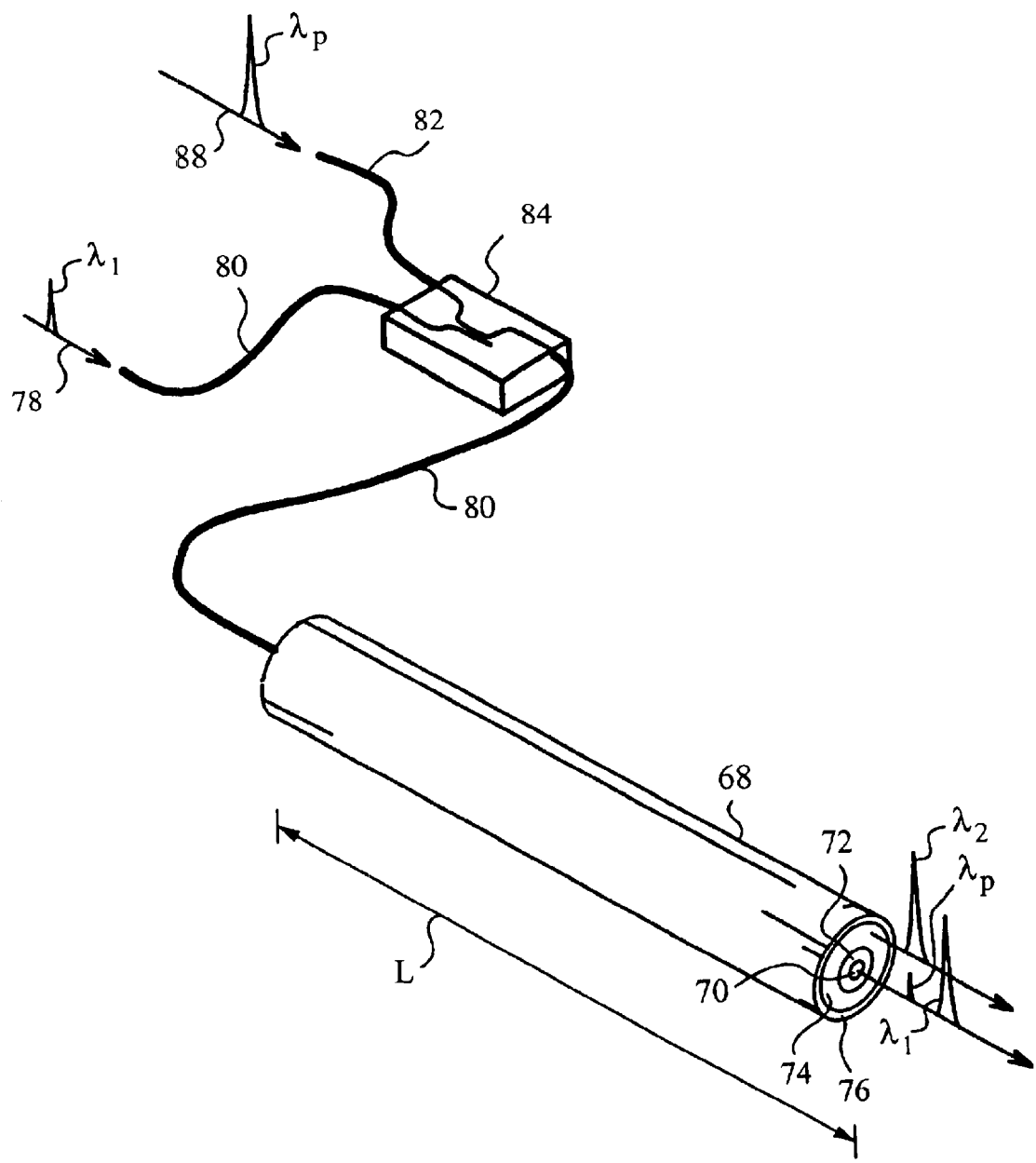
FIG. 4 is an isometric view of an EDFA in accordance with the invention.

W-profile Er-doped fiber 10 designed in accordance with the above rules finds its application as an amplifier 68 (EDFA) using alumino-germanosilicate glass as the host material, as shown in FIG. 4. EDFA 68 is doped with a concentration of 0.1% wt. of Er in a core 70 of index $n_0$. Core 70 is surrounded by a depressed cladding 72 of index $n_1$ and a secondary cladding 74 of index $n_2$. EDFA 68 has a protective jacket 76 surrounding secondary cladding 74 to offer mechanical stability and to protect EDFA 68 against external influences.

A signal radiation 78 at a first wavelength $\lambda_1$ contained within S-band 42 is delivered to EDFA 68 for amplification from a fiber 80. For example, signal radiation 78 can be an information-bearing signal requiring amplification.

Fiber 80 is coupled with a fiber 82 in a wavelength combiner 84. Fiber 82 is used to couple a pump radiation 88 from a pump source 86 to EDFA 68. Pump source 86, preferably a laser diode, provides pump radiation 88 at a pump wavelength $\lambda_p$ of about 980 nm for pumping the Er ions in core 70 to achieve a high level of relative population inversion D. Parameter D varies from D=−1 indicating no population inversion to D=1 signifying complete population inversion. When D=0, exactly half of the Er ions are in the excited energy state or manifold of states, while half remain in the ground energy manifold. In this case, EDFA 68 is approximately transparent. For non-uniformly inverted EDFAs, parameter D is considered as the average value of inversion. In the present embodiment, the intensity of pump radiation 88 is determined such that it ensures a relative inversion of D≧0.7 in the Er ions.

Pump radiation 88 and signal radiation 78 are combined in combiner 84 and both delivered to EDFA 68 by fiber 80. More particularly, both signal and pump radiation 78, 88 are coupled into core 70 from fiber 80.

Core 70 and claddings 72, 74 all have circular cross sections in this embodiment. The cross sections and indices $n_0$, $n_1$, $n_2$ are selected in accordance with the method of invention to set cutoff wavelength $\lambda_c$ near 1525 nm. In other words, cutoff wavelength $\lambda_c$ is selected to be between S-band 42 and long wavelength band 46 or the C-band and L-band.

It is important that index $n_0$ of core 70 be chosen to provide for a large negative slope in effective index $n_{eff}$ with respect to wavelength, preferably about 0.008/1,000 nm, near cutoff wavelength $\lambda_c$. As a result, the roll-off loss curve exhibits a rapid decrease for wavelengths below cutoff wavelength $\lambda_c$ ensuring that the losses in S-band 42 are lower than the positive gains. The losses produced by this roll-off loss curve increase rapidly for wavelengths larger than cutoff wavelength $\lambda_c$. Thus, the losses produced in the C- and L-bands 46 are at least comparable to the high gains.

Designing EDFA 68 in accordance with the invention will ensure that signal radiation 78 at $\lambda_1$ is amplified while ASE at any wavelength $\lambda_2$ in the C- and L-bands 66, and especially at $\lambda_2$=1530 nm is rejected into cladding 74 as shown. Positive gains in S-band 42 will typically be on the order of 5 dB above the losses and thus, to obtain sufficient amplification of signal radiation 78, EDFA 68 requires a certain length L. The smaller the difference between the positive gains and losses in the S-band 42, the longer length L has to be to provide for sufficient amplification of signal radiation 78.

Figure 5:
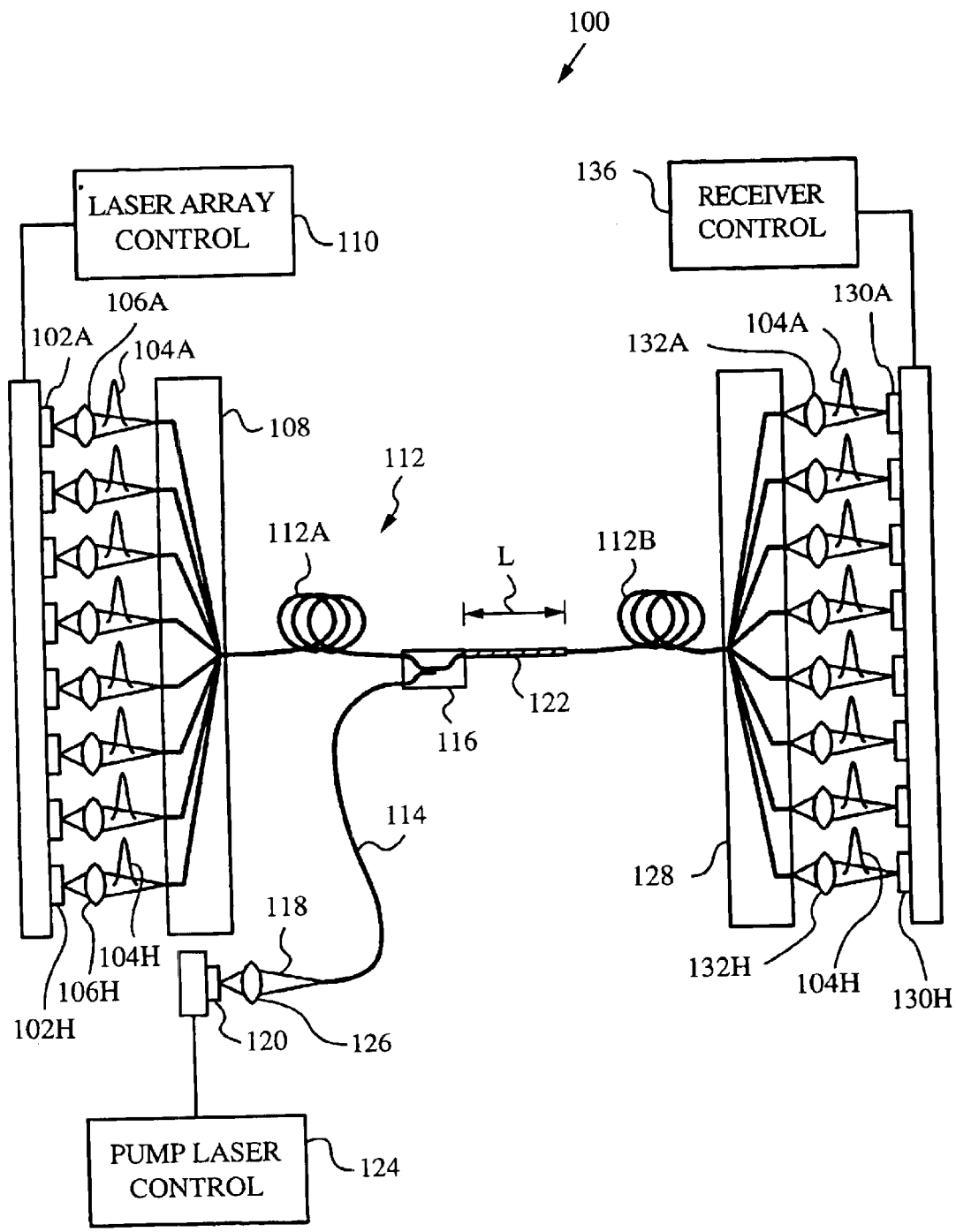
FIG. 5 is a diagram illustrating the use of EDFAs in an optical communication system.

FIG. 5 illustrates an optical communication system 100 using a signal source 102A that provides a signal 104A in the S-band. Source 102A is a diode laser belonging to an array of sources 102A through 102H. In fact, communication system 100 is a Wavelength-Division-Multiplexed (WDM) or even a dense WDM (DWDM) or coarse WDM (CWDM) communication system in which all eight sources 102A through 102H generate signals 104A through 104H at eight different wavelengths or in eight wavelength channels within the S-band. We note here that while in this example we describe a WDM system 100 with just eight channels, WDM systems can use any number of channels from 2 to over 1,000, as is well known in the art. The array of sources 102A through 102H is controlled by a laser array control 110. Control 110 may include any suitable electronic or optical pumping mechanisms for driving diode lasers 102A through 102H.

A set of optics 106A through 106H, in this case lenses, is provided for focusing and in-coupling signals 104A through 104H into a WDM multiplexer 108. Multiplexer 108 combines signals 104A through 104H and launches them in accordance with well-known WDM protocols through a first span 112A of a common communication fiber 112. Span 112A of communication fiber 112 spans a large distance, e.g., several tens of kilometers. Preferably, communication fiber 112 is selected among fibers that exhibit a low, but sufficient amount of dispersion in the S-band to prevent non-linear effects from affecting signals 104A through 104H. For example, fiber 112 has a dispersion of 3 to 10 ps/nm·km, but no less than 1 ps/nm·km in the S-band. In addition, it is advantageous that fiber 112 exhibit low losses in the S-band, e.g., 0.2 to 0.3 dB/km.

Fiber 112 extends between WDM multiplexer 108 and a WDM demultiplexer 128. After span 112A, fiber 112 is coupled with a fiber 114 in a wavelength combiner 116. Fiber 114 is used to couple a pump radiation 118 obtained from a pump source 120 to an EDFA 122 installed after span 112A. Pump source 120, is a laser diode emitting pump radiation 118 at a pump wavelength $\lambda_p$ of about 980 nm for pumping the Er ions in the core of EDFA 122 to a high level of relative population inversion D. Source 120 is controlled by a pump laser control 124 that can include any suitable electronic or optical pumping mechanisms. A set of optics 126, in this case a lens is used to in-couple pump radiation 118 into fiber 114.

EDFA 122 is connected to a second span 112B of fiber 112. In fact, system 100 can have a number of spans and a number of EDFAs installed at certain intervals between these spans. In the present embodiment, span 112B terminates at WDM demultiplexer 128. WDM demultiplexer 128 separates signals 104A through 104H by wavelength and delivers them to respective receivers 130A through 130H with the aid of optics 132A through 132H. In this embodiment optics 132A through 132H are lenses. A receiver control 136 is in communication with receivers 130A through 130H. Control 136 can include any signal level adjustments and other functionalities including signal processing functions required for detecting and processing signals 104A through 104H.

In the embodiment shown, EDFA 122 is employed by communication system 100 as an in-line amplifier. Specifically EDFA 122 has a length L tailored to provide sufficient amount of gain in the S-band to amplify signals 104A through 104H. For example, the length L can be in the range of 5 to 50 meters. At the same time, EDFA 122 is adjusted to exhibit a low noise figure, e.g., 6 dB or lower and a flat gain spectrum. Suitable gain flattening filters (not shown) can be used, e.g., in the middle of EDFA 122 to ensure a gain-flattened spectrum, as will be appreciated by those skilled in the art.

Alternatively, EDFA 122 can be used as a power-boosting amplifier. For this purpose, the power of pump source 120 is increased to raise the saturation power of EDFA 122. At the same time, other design changes and optimizations can be made. For example, the Er doping concentration and length L can be increased in order to increase the efficiency of absorption of pump radiation 118 at the expense of noise figure. Also, EDFA 122 can be designed for cladding pumping in this configuration. Cladding pumping is a well-known technique in the field of C-band EDFA manufacture. A low-cost, high-power, wide stripe 980 nm diode pump laser is used as pump source 120 when EDFA 122 is designed for cladding pumping. S-band EDFA 122 can also be optimized for high power by eliminating the gain-flattening filters, reducing the amount of gain flattening or moving the gain-flattening filter to an earlier stage in embodiments where EDFA 122 is made up of a number of segments (multi-stage EDFA). This will increase the overall efficiency of EDFA 122 and therefore the saturation power because it reduces the internal losses of EDFA 122. Typically, power amplifiers are used under heavy saturation or sometimes with a single channel, so that gain-flattening is not as important for power amplifiers as it is for in-line amplifiers.

System 100 can also use EDFA 122 as a pre-amplifier of signals 104A through 104H. In this case, length L is reduced to less than 50 meters, or even less than 10 meters and the noise figure is carefully controlled by a combination of fiber design parameters and gain flattening filers. A pre-amplifier is typically used for a single signal channel and at low optical power levels, but with moderate requirements for gain. Therefore, gain flattening is typically not required, and amplifier efficiency is not important. The key design criterion for pre-amplifiers is the noise figure.

Figure 6:
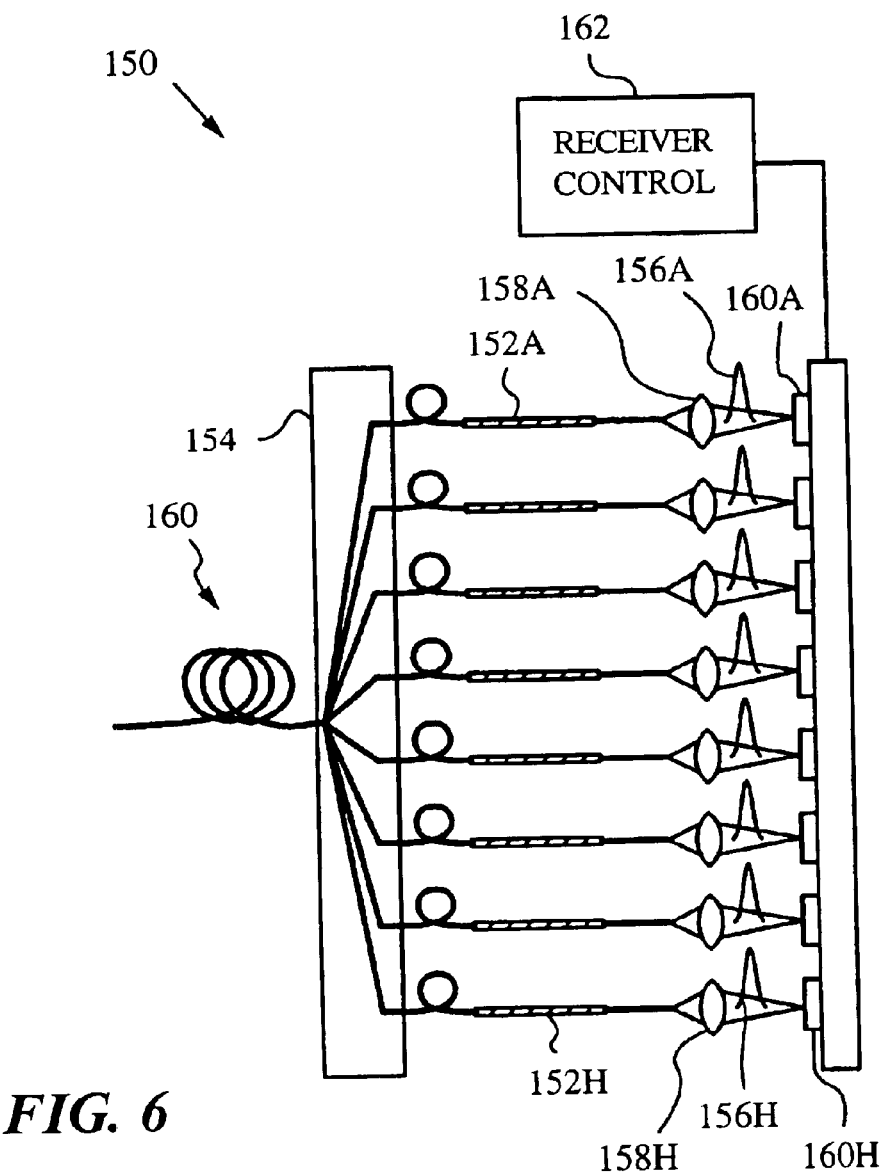
FIG. 6 is a diagram illustrating the use of EDFAs as pre-amplifiers at the receive end of an optical communication system.

FIG. 6 illustrates a portion of another optical communication system 150 in which a number of EDFAs 152A through 152H in accordance with the invention are used as pre-amplifiers. System 150 has a WDM demultiplexer 154 for demultiplexing a number of signals 156A through 156H delivered over a communication fiber 160. A set of lenses 158A through 158H are positioned to focus signals 156A through 156H demultiplexed by WDM demultiplexer 154 on corresponding receivers 160A through 160H. As in the previous embodiment, receivers 160A through 160H are controlled by a receiver control 162.

In this embodiment, EDFAs 152 are installed after a WDM demultiplexer 154. This is the preferred location for EDFAs 152 when they are designed to function as pre-amplifiers. That is because in this position each EDFA 152A through 152H processes only one of signals 156A through 156H and can thus be better tuned to achieve low noise pre-amplification.

Figure 7:
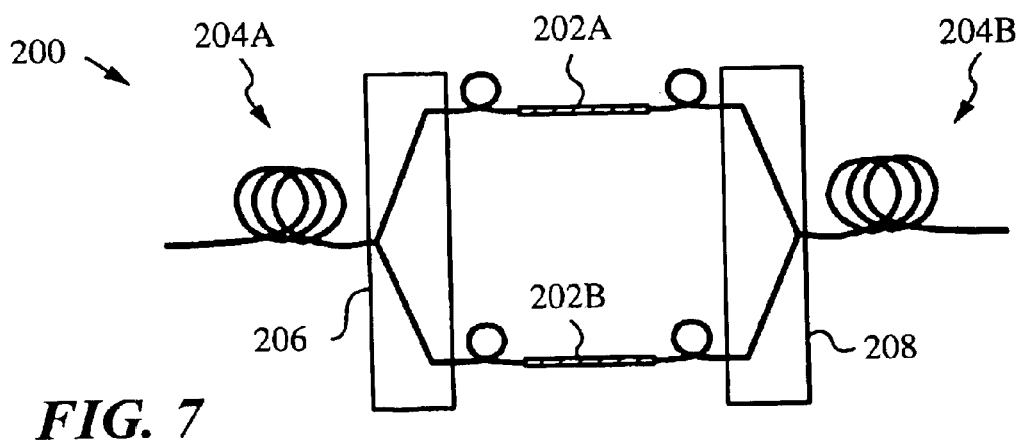
FIG. 7 is a diagram illustrating a portion of an optical communication system employing EDFAs for amplifying sub-bands of the S-band.

FIG. 7 illustrates a portion of yet another optical communication system 200 employing S-band EDFAs 202A and 202B according to the invention for different portions or sub-bands of the S-band. EDFAs 202A, 202B are installed between two spans 204A, 204B. A WDM demultiplexer or splitter 206 and WDM multiplexer or combiner 208 are used to deliver the appropriate portions of the S-band wavelengths to each EDFA 202A, 202B. In this embodiment, EDFA 202A is optimized for amplifying a sub-band of wavelengths between 1460 and 1490 nm and EDFA 202B is optimized for amplifying a sub-band of wavelengths between 1490 and 1520 nm. Of course, more than two EDFAs could be used for amplifying even smaller portions of the S-band, as desired. Communication system 200 can use a wider total range of wavelengths in the S-band.

It should be noted that S-band EDFAs 202A, 202B can be combined with C-band and/or L-band EDFAs if communication system 200 is designed to transmit signals over some or all of these bands. In general, a person skilled in the art will recognize that the use of S-band EDFAs in conjunction with C-band or L-band EDFAs and/or with two or more sub-bands within the S-band can be implemented at any position within communication system 200, and is not limited to use as in-line amplifiers, pre-amplifiers and power amplifiers.

It will be clear to one skilled in the art that the above embodiments may be altered in many ways without departing from the scope of the invention. Accordingly, the scope of the invention should be determined by the following claims and their legal equivalents.

What is claimed is:

1. An optical communication system comprising:
   a) a signal source for providing a signal in an S-band of wavelengths;
   b) a fiber amplifier for amplifying said signal, said fiber amplifier having:
      1) a core doped with Erbium and having a core cross-section and a refractive index $n_0$;
      2) a depressed cladding surrounding said core, said depressed cladding having a depressed cladding cross-section and a refractive index $n_1$;
      3) a secondary cladding surrounding said depressed cladding, said secondary cladding having a secondary cladding cross-section and a refractive index $n_2$;
      4) a pump source for pumping Erbium contained in said core to a relative inversion D greater than about 0.7, such that said active material exhibits positive first gains in said S-band and second gains in a long wavelength band longer than said S-band, wherein said second gains are higher than said first gains;
   wherein said core cross-section, said depressed cladding cross-section, and said refractive indices $n_0$, $n_1$, and $n_2$ are selected to produce losses at least comparable to said second gains in said long wavelength band and losses substantially smaller than said first gains in said S-band.

2. The optical communication system of claim 1, wherein said fiber amplifier is an amplifier selected from the group consisting of pre-amplifier, power-boosting amplifier, and in-line amplifier.

3. The optical communication system of claim 1, wherein said optical communication system is a Wavelength-Division-Multiplexed communication system.

4. The optical communication system of claim 3, wherein said fiber amplifier is an amplifier selected from the group consisting of pre-amplifier, power-boosting amplifier, and in-line amplifier.

5. The optical communication system of claim 3, further comprising:
 a) a communication fiber;
 b) a Wavelength-Division-Multiplexer for multiplexing said signal over said communication fiber; and
 c) a Wavelength-Division-Demultiplexer for demultiplexing said signal.

6. The optical communication system of claim 5, wherein said fiber amplifier is a pre-amplifier installed after said Wavelength-Division-Demultiplexer.

7. The optical communication system of claim 5, wherein said fiber amplifier is installed between said Wavelength-Division-Multiplexer and said Wavelength-Division-Demultiplexer.

8. The optical communication system of claim 7, wherein said fiber amplifier is an amplifier selected from the group consisting of pre-amplifier, power-boosting amplifier, and in-line amplifier.

9. The optical communication system of claim 3, wherein said signal source comprises a laser belonging to a laser array.

10. The optical communication system of claim 1, wherein said long wavelength band comprises at least a portion of the C-band or L-band.

11. The optical communication system of claim 1, wherein said pump source is a laser diode providing pumping radiation at about 980 nm.

12. The optical communication system of claim 1, wherein said signal is an information-bearing signal.

13. The optical communication system of claim 1, wherein said fiber amplifier is tuned for amplifying a sub-band of said S-band.

* * * * *